April 14, 1964 G. L. HASSLER 3,129,146
METHOD AND APPARATUS FOR SEPARATING SOLVENTS FROM SOLUTIONS
BY DISTILLATION ACTIVATED BY PRESSURE
Original Filed July 16, 1959 2 Sheets-Sheet 1

| Temperature °C | | 20.00° | 20.05° | | |
|---|---|---|---|---|---|
| Vapor Density gms/cm | | $17.2 \cdot 10^{-6}$ | $17.4 \cdot 10^{-6}$ | $17.6 \cdot 10^{-6}$ | $17.8 \cdot 10^{-6}$ |
| Salt Concentration Mols/Ltr. | 0.0 | 0.2 | 0.4 | 0.8 | |
| Pressure, Atmospheres | 0 | 20.0 | 40.0 | 60.0 | |

GERALD L. HASSLER,
INVENTOR.

HERZIG & JESSUP,
Attorneys.

BY

April 14, 1964 G. L. HASSLER 3,129,146
METHOD AND APPARATUS FOR SEPARATING SOLVENTS FROM SOLUTIONS
BY DISTILLATION ACTIVATED BY PRESSURE
Original Filed July 16, 1959 2 Sheets-Sheet 2

SEA WATER IN  FRESH WATER OUT

GERALD L. HASSLER,
INVENTOR.
HERZIG & JESSUP,
Attorneys.
BY

United States Patent Office 3,129,146
Patented Apr. 14, 1964

3,129,146
METHOD AND APPARATUS FOR SEPARATING SOLVENTS FROM SOLUTIONS BY DISTILLATION ACTIVATED BY PRESSURE
Gerald L. Hassler, Los Angeles, Calif., assignor to The Regents of the University of California, Berkeley, Calif., a corporation
Continuation of application Ser. No. 827,529, July 16, 1959. This application Oct. 18, 1962, Ser. No. 232,665
17 Claims. (Cl. 202—51)

The present invention relates to a method and apparatus for separating a portion of solvent from a solution and in particular relates to a method and apparatus for separating fresh water from saline solution, such as sea water. This application is a continuation of application, Serial No. 827,529, filed on July 16, 1959, and now abandoned, which was itself a continuation-in-part of application, Serial No. 436,396, filed June 14, 1954 and now abandoned.

Among the other objects of the invention is the provision of a method and apparatus for separating solvent from a solution in which the components cannot be heated to distillation temperatures because of thermal instability.

Another object of the present invention is to provide a method and apparatus for efficiently and economically separating pure water from sea water and particularly in that this may be accomplished with practical, economical and easily fabricated and manufactured materials which are readily available.

A further object of the present invention is to provide a method for separating solvents from solutions by distillation wherein the distillation is activated or brought about by pressure, that is, the energy input is pressure energy.

Another object of the present invention is to provide a method wherein the method is operated substantially without temperature differences and includes the steps of causing solvent vapor to migrate from a body of a solution to a body of solvent. Such solvent vapor traverses a relatively thin gap or space between such body of solution and body of solvent which has a higher pressure therein to insure that only solvent traverses the gap or space.

Another object of the present invention is to provide a method wherein evaporation takes place at the surface of a first porous wall member and condensation at the surface of a second porous wall member, the pressure difference between the vapor being transported and the condensed solvent being sustained by the capillary of the second porous wall member.

Another object of the present invention is to provide an apparatus suitable for carrying out the foregoing process.

Another object of the present invention is to provide an apparatus wherein the porous walls are cellophane sheets and the space between them is an air gap.

Another object of the present invention is to provide an apparatus as in the foregoing wherein the air gap is maintained by powder.

In general, the present invention involves distillation by the use or application of pressure energy without using external heat energy. Thus a body of solution is subjected to a pressure greater than the pressure of an adjacent body of solvent with such solution pressure being sufficient to increase the vapor pressure of the solvent therein above the vapor pressure of the solvent in the body of solvent. In other words, the pressure on the solution is greater than the osmotic pressure which normally tends to move solvent from the body of solvent to the body of solution.

An exemplary apparatus of the present invention may comprise a cell including an enclosed body of solvent and an enclosed body of solution with said solution maintained under a pressure greater than the pressure on said body of solvent. The pressure on said body of solution is set sufficiently higher to increase the vapor pressure of the solvent therein above the vapor pressure of the solvent in said body of solvent. A pair of closely spaced, thin, permeable sheets or walls separate the body of solvent from the body of solution and said sheets or walls have a narrow gap therebetween. A body of fluid is enclosed in said gap at a pressure greater than the pressure on the body of solution. Such body of fluid is adapted to permit the flow of solvent vapor and to prevent the flow of solution from the body of solution to said body of solvent. Also, the sheets or walls produce sufficient capillary forces to maintain the body of fluid in said gap and the pressure difference between the gap and the body of solvent.

In order to facilitate the understanding of the method and apparatus of the present invention, reference will now be made to the appended drawings of specific embodiments of the present invention. Such drawings should not be construed as limiting the invention which is properly set forth in the appended claims.

The invention will be described in particular as applied to the separation of relatively pure water from sea water. It is to be understood, however, that the invention is applicable generally to the separation of solvents from solutions. The disclosure herein is intended to be exemplary and illustrative of the application of the method and apparatus and it illustrates particularly the principle of the use of two porous, permeable sheets in a cell separated by a narrow gap within which is maintained a pressure in excess of the entering pressure of the solution to be distilled. A further basic characteristic and principle of the present invention is the sustaining of a difference in pressures as between the entering solution and the purified solvent discharge without a solid intervening wall, but, rather, by capillary forces.

Figure 1:
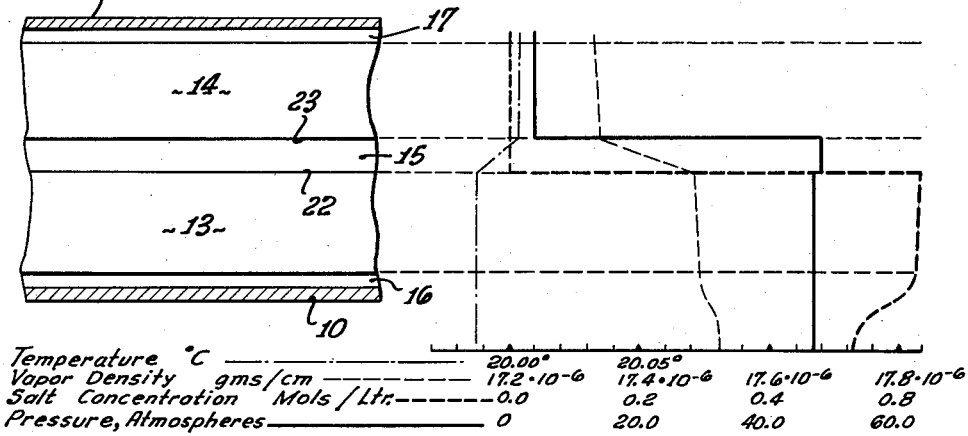
FIG. 1 is a greatly enlarged schematic diagram representing a vertical section through a small portion of one form of a cell of the present invention illustrating the method and apparatus of the present invention and graphically showing the temperature, vapor density, salt concentration and pressure conditions at different levels in the cell.

FIG. 1 illustrates a cell of the present invention which may have exterior walls 10 and 11 which may be either rigid or flexible, for example, of rubber. A pair of closely spaced, thin permeable sheets 13 and 14 are between the walls 10 and 11 and have a gap 15 between them. The sheets or walls 13 and 14 are composed of a permeable material, such as cellophane. They may also be composed of a firm gel, a cloth impregnated with gelatinous material or a double layer of cloth enclosing a layer of powdered material. In the case of cellophane, the sheet may be about 0.001 inch thick, for example, and in the case of the strip gelatine film, such as used in photography, the thickness may be about 0.002 inch.

The gap 15 between the permeable sheets or walls 13 and 14 may be in the range of about 100 angstroms to about 0.005 inch. Preferably, the gap or zone or space 15 should be as small as possible. When the gap 15 is occupied by oil, then a thickness of approximately 100 angstroms may be obtained. When the gap 15 is occupied by air, a thickness of about 15 microns may be obtained. When the gap 15 is occupied by a layer of fine powder, then a thickness of about 0.001 inch may be obtained. In addition to air, the gap 15 may consist of other gases, such as hydrogen which has the advantage of low viscosity and producing rapid diffusion across the gap 15. In addition, as indicated above, the gap 15 may also contain oils, such as paraffin oils, vegetable or animal oils, oils having molecules containing various polar groups, and synthetic oleaginous materials having the common property of being immiscible with water and through which vapor molecules can diffuse. For purposes of simplicity in FIG. 1 it is assumed that the gap 15 consists of a film of air.

Figure 2:
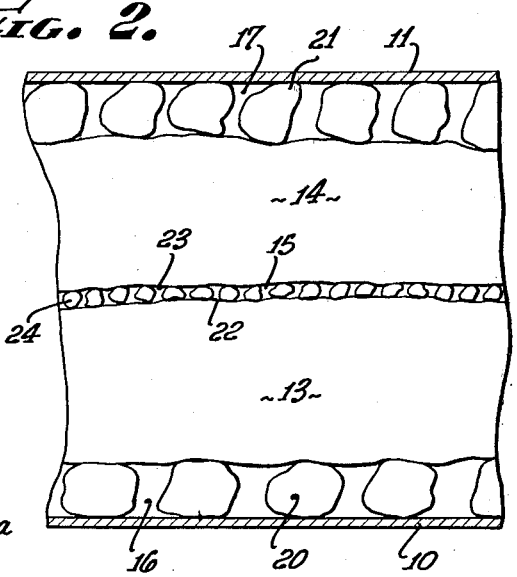
FIG. 2 is a view similar to FIG. 1 representing another form of the cell of the present invention.

Numerals 16 and 17 designate a solution inlet chamber and a solvent outlet chamber. The chambers 16 and 17 on the outside of the exterior surface of the porous sheets 13 and 14 may be, as shown in FIG. 2, packed with granules 20 and 21, respectively, of a material, such as refined, diatomaceous earth filter aid. The particle size of these granules may be in the range of about 2 to about 100 microns and they may be applied to the outer surfaces of the porous walls or sheets 13 and 14 by dusting and then spread by scraping the dusted surface with doctor blade associated with a roll over which the supporting sheets are passed. The granules 20 in chamber 16 may be somewhat larger than the granules 21 in chamber 17 to permit a more rapid flow of sea water through chamber 16 than of purified or fresh water through chamber 17. Instead of using the granules 20 and 21, as described, these chambers may be occupied by sheets or layers of filter paper.

To illustrate the nature of the invention and its operation, sea water, by way of example, is caused to flow through the chamber designated at 16 of the cell at a desired slow rate while being maintained under a pressure of about 30–100 atmospheres. The sea water contacts and flows slowly past the lower surface of the sheet 13. In addition, the sea water is absorbed into the sheet 13 by the capillary forces therein and may flow to the lower boundary 22 of the gap 15. On reaching the boundary surface 22, the water molecules, due to the excess pressure on the sea water in chamber 16, vaporize and diffuse across the gap 15 and condense on the lower boundary surface 23 of the supporting porous sheet or wall 14. Since they cannot vaporize, the ions of the salt molecules do not pass across the boundary 22. Accordingly, the gap 15 may be described as a membrane which is completely selective in the sense that it will act as a barrier to salt and, nevertheless, pass the vapor therethrough.

To insure that there are no liquid water channels or leaks through the gap 15 through which the salt molecules might pass, an additional pressure increment on the order of about three to five pounds per square inch is preferably maintained in the gap 15 above the pressure in chamber 16. It has been discovered that it is possible to utilize this higher pressure in the gap 15 for the purpose stated, but that nevertheless water will evaporate at the boundary 22 and condense at the boundary 23. This effect was observed in various reductions to practice of the present invention and may be both experimentally and theoretically demonstrated. As set forth below, the phenomena results from the higher vapor pressure of the water in sea water relative to the vapor pressure of the pure water.

The condensed water on the lower surface 23 of the porous wall or sheet 14 enters a body of pure water having a pressure relatively much lower than the pressure in the gap 15. The varied small capillary spaces in the porous sheet or wall 14 supports the pressure difference between the gap 15 and the purified water in chamber 17. The pressure in chamber or space 17 normally is maintained at a value in the range of about one to several atmospheres, but may be under partial vacuum. The purified water is withdrawn from chamber 17 as a product at a rate equivalent to the rate of migration from the chamber 16 through the sheets 13 and 14 and across gap 15.

The right side of FIG. 1 shows graphically and ideally the change of temperature, vapor density, salt concentration and pressure through the cell. In other words, this chart shows the gradients of these variables across the cell structure. As will be observed, there is a slight rise in temperature and the temperature line going from the boundary 23 which represents the heat of condensation released by the water condensed on the boundary surface 23.

The variables appearing in legend in FIG. 1 are measured horizontally on the scale at the bottom of the righthand part of the figure. Considering the temperature represented by the line with short dashes, it may be seen that the temperature gradient across the laminar structure is fairly constant, except for the rise between hte boundaries 22 and 23. As previously pointed out, the process is one in which the distillation is activated by pressure and it operates substantially without a temperature differential.

Considering the vapor density represented by the lighter dashed line, it may be observed that the vapor density is fairly constant through the sheet or wall 13, it drops across the gap 15 and is clearly constant at a reduced value across the sheet or wall 14. Since the vapor density is directly proportional to the vapor pressure, the lighter dashed line represents graphically the result of the higher pressure on the sea water and the driving force moving the water vapor from the sea water to the fresh water.

The salt concentration is represented by the heavier dashed line and, as may be seen, it is relatively large and remains fairly constant across the porous wall 13. At the boundary 22, it reduces very substantially from about 0.75 to, substantially, 0 and remains constant at 0 across the space 15 and the porous wall 14.

The pressure in atmospheres is represented by the full line and, as may be seen, it is fairly constant across the porous wall 14 and increases slightly in the space or gap 15. At the boundary surface 22, it reduces very substantially and is then fairly constant, but reducing slightly against the porous wall 14.

The following specific example is illustrative of a particular embodiment of the present invention as to its specific construction and operation.

*Example*

Porous clay plates were spaced about 0.005 to 0.001 inch apart to provide a layer of air between them to serve as a continuous barrier zone. The spacing was tested by the use of an electric impedance or resistance method. A feed solution of about 1300 parts per million by weight of solution of sodium chloride was fed to the cell as described above in connection with the discussion of FIG. 1. I discovered that a flow of pure water takes place across the air layer or membrane at the rate of about 4.64 times $10^{-3}$ cubic centimeters per day per square centimeter for each inch of mercury pressure applied to the feed solution in excess of its osmotic pressure. This particular test was made with a very dilute solution and with very or relatively low pressure applied to the feed solution.

Referring to the embodiment of FIG. 2, the porous sheets or walls 13 and 14 are shown spaced apart the desired distance by a very thin layer of powder 24 in the gap 15. The powder may be fine Xerox, or may be a silicon-treated talc so that the spacing may be about 0.001 inch with the powder serving to maintain the spacing between the porous sheets or walls 13 and 14. By way of example, this powder preferably is water-repellent and may be a metallic sulphite, such as galena, or a powdered paraffin wax of high molecular weight. The water-repellent powder is preferably of a particle size in the range of about 0.1 to 1 micron and may be applied to supporting sheets or walls 13 and 14 by the electrostatic transfer process. Such process involves the steps of electrostatically attracting powder onto a transfer roll and then repelling the powder to produce a uniform spread onto the supporting surfaces 22 and 23 of the walls 13 and 14 by effecting a voltage change in the roll.

The materials which may be used in the spaces 16 and 17 have been previously described. The migration of solution through the layered structure or the specific cell of FIG. 2 is similar to that described in connection with the more generalized representation of FIG. 1. The water molecules, upon reaching the surface 22 after migrating through the supporting porous wall 13 vaporize from the surface 22, diffuse through the air spaces in the gap 15 between the particles of the powder 24 and condense on the surface 23. The pure water in chamber 17, because of sheet 14, possesses a multiplicity of highly curved meniscuses or interfaces adjacent to the surface 23 which receives the condensed water. The surface 23 thus is a phase boundary created by capillary forces which supports the excess pressure in the gap 15. In other words, the water in the capillary pore in sheet 14 is subjected to a substantially lower pressure than the sheet 14 due to the capillary forces at the interface between the water and the gap 15.

Figure 3:
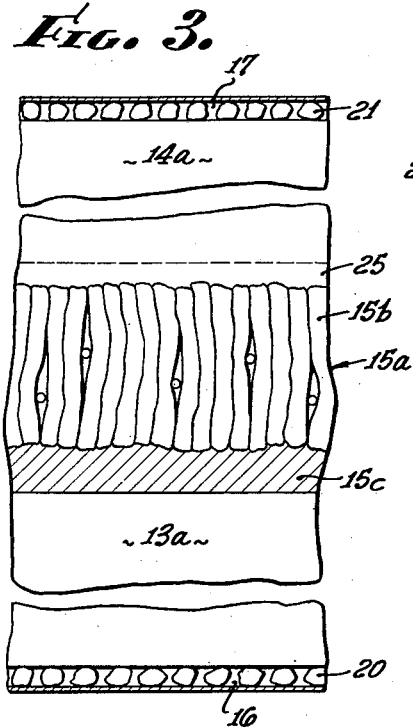
FIG. 3 is a view similar to FIG. 1 representing still another form of the cell of the present invention.

The layered structure shown schematically in vertical cross-section and very greatly enlarged in FIG. 3 is composed of a supporting permeable cellulose gel membrane 13a and oriented carbon chain, monomolecular layer 15a serving as the gap fluid and a coarse gel supporting sheet or layer 14a. The layer or gap 15a may comprise fatty acids, polyglycerides, steroids or phospholipids, for example. These materials have molecular structure which consists of hydrocarbon chains or substituted hydrocarbon chains having a hydrophilic group on the hydrocarbon chain. Numeral 15b designates the vertically oriented hydrocarbon chains in which the molecules are polarized and oriented. Numeral 15c designates a layer of proteinaceous stabilizer with the chains positioned as shown, and the hydroxyl groups being at one side.

The composite cell of FIG. 3 may be prepared as follows: having selected a sheet of cellophane 14a of about 10,000 angstroms' thickness, a very thin film of gelatin 25 is beaded onto the surface of the cellophane layer 14a by means of a doctor blade associated with a roll of cellophane sheet, for example. The exposed surface of the gelatin film 25 may be hardened by washing it with a formaldehyde fixing solution. This treatment makes the gelatin surface more receptive to the oriented monomolecular membrane layer 15a. This layer is first formed by placing a small amount of oil, having long chain hydrocarbon molecules on a clean surface of water containing a proteinaceous material. The oil is then allowed to spread into a film under the influence of the surface forces. The oil film thus formed is then transferred onto the exposed prepared surface of gelatin film 25 by moving the gelatin film obliquely upward through the plane of the water surface on which the oriented film with the protein stabilizer has been formed with the protein stabilizer as just described. In preparing the membrane, the oil film may be formed using sterol or lecithin. Preferably the proteinaceous material may be a mixture of lard oil and gelatin.

The film 15a thus formed consists of vertically oriented hydrocarbon chains 15b having polar groups embedded in a layer of stabilizing protein 15c and may have a thickness of about 200 angstroms. The polarized molecules have positive and negative portions in the chains with the hydroxyl groups at one side, as they appear in the arrangement as shown in FIG. 3. Finally, the film 15a is covered with a thin supporting layer of permeable gelatin 13a. The gelatin is formed on the exposed surface of the protein film 15c by spraying or beading the gelatin on the film in any convenient manner to a thickness of about 1000 angstroms.

The complete membrane or layered structure 13a, 14a and 15a thus formed is supported in a diffusion cell by packing it between the layers of powder granules 20 and 21 in chambers or spaces 16 and 17, respectively. The migration of water through the composite structure 13a, 14a and 15a in FIG. 3 is similar to that described above in connection with FIGS. 1 and 2. Sea water migrates through the supporting layer 13a under pressure from the adjacent sea water in chamber 16. The water then vaporizes or escapes into the gap 15 and condenses on the lower boundary of gelatin film 25. The condensed water molecules migrate to the supporting layer 14a into the body of purified water above the upper surface of this layer in chamber 17.

Figure 4:
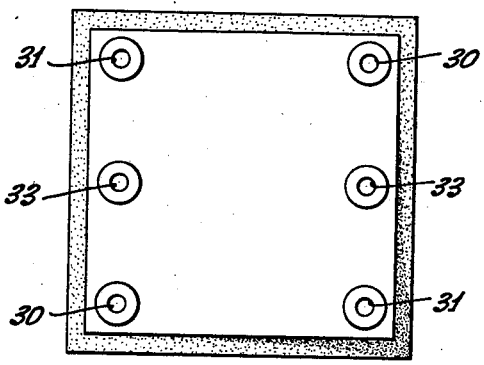
FIG. 4 shows a single sheet or lamination portion of the units of the previous figures for use in an embodiment of the apparatus wherein the cells are stacked.
Figure 7:
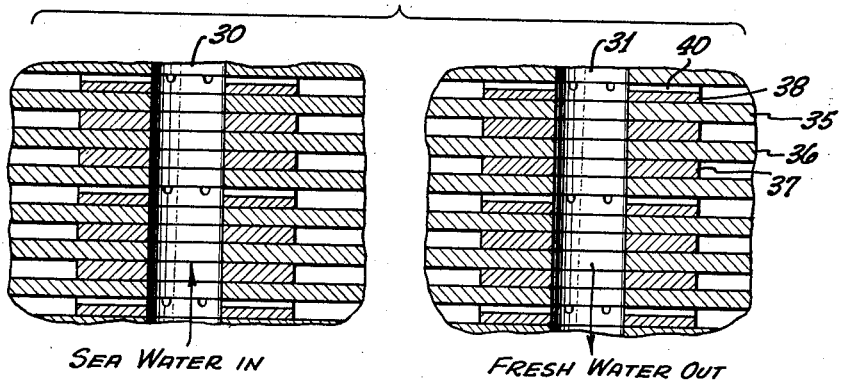
FIG. 7 is a cross-sectional view showing a sea water feed manifold and a fresh water discharge manifold in the stack of FIG. 6.
Figure 6:
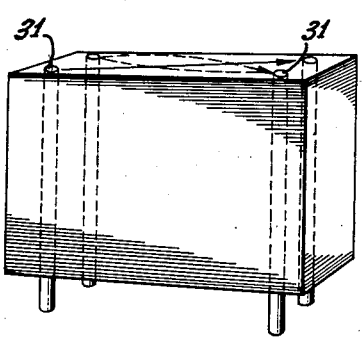
FIG. 6 is a perspective view of a stack of sheets or laminations assembled to form a multiple stack of cells.

The interstices of the sheets 13 and 14, such as cellophane, for example, are preferably so small as to prevent air at about 50 atmospheres pressure from passing through the sheet if good flow rates are to be obtained with single-stage processing of sea water. The sheets may be perforated or have apertures as shown in FIG. 4 to form sea water openings 30, fresh water openings 31 and fluid openings (air or other fluid) 33 and mounted or assembled back to back so that in operation a stack of them will be formed as shown in FIGS. 6 and 7. Mounting back to back means that when two distilling units, such as shown in cross-section in FIG. 2 are stacked, the upper one is reversed or inverted so that the fresh water spaces of the two units are adjacent each other. In illustrating the units assembled into a rack, units are represented diagrammatically in FIG. 7 (greatly enlarged) as comprising sheets or layers 35 and 36 on opposite sides of a gap or space. This illustration is intended to represent individual units having a cross-section as shown in FIG. 2.

Figure 5:
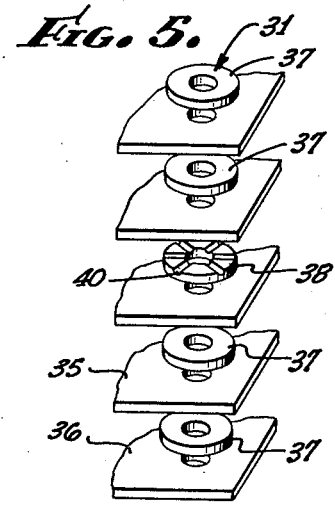
FIG. 5 is an exploded, perspective view showing the stacked sheet having perforations and spacer-washers which, when assembled, form a stack as in FIG. 6.

FIG. 5 illustrates an exemplary manner of assembling the sheets or layers in individual cells or units and assembling the units into a stack as shown in FIGS. 6 and 7. The sheets or layers are spaced at the positions of the openings by washers, as shown at 37 and 38. These washers or rings are made of impermeable material spacing the sheets at the positions of the holes or openings. As will be apparent, the aligned holes or openings form a plurality of manifolds through the assembled units; that is, the stack. Wherever adjacent sheets are spaced by a washer, such as 37, the flow through the manifold is prevented from entering between those sheets. Preferably, the washers are cemented to the sheets. The washers 38 have radially extending channels as shown at 40 which extend from the central opening in the washer to the periphery. This type of washer is used to space adjacent sheets wherever it is desired to provide for a flow as between the manifold and the space between those sheets in the stack. Therefore, considering FIG. 5, the manifold 31 as shown is one representing a manifold through which fresh water is withdrawn from the stack. Therefore, washers such as 38 having the radial channels are used to space those adjacent sheets which enclose a fresh water chamber or zone.

FIG. 7 illustrates the arrangement of the stacked sheets, the manifolds and the use of the washers. In the stack of FIG. 6, four of the manifolds are shown, two manifolds 33 being omitted. In this assembly, the stacked sheets or layers are sealed or enclosed all around the side edges, except for the gap or space 15 as shown in FIG. 1. The entire assembly is in a tank containing the fluid which it is desired to have enter the gap or spaces 15. This stack may be enclosed in a plate filter press and wholly immersed in a tank.

Sea water is fed into a tube or manifold 30, FIGS. 6 and 7, at a pressure of about 500 pounds per square inch and it enters the sea water passages held apart by the powder pack. The fresh water passages 31 are also held apart by the powder pack. Fresh water at about five pounds per square inch pressure passes out of the stack through the passages emptying into a tube or manifold 31. The used sea water leaves the stack through a manifold 30 and recirculating fresh water is introduced into the stack through a manifold 31.

There are many features in the present invention which clearly show the significant advance the present invention represents over the prior art. Consequently, only a few of the more outstanding features will be pointed out to illustrate the unexpected and unusual results attained by the present invention. One of the basic features of the present invention is the utilization of "reverse osmosis" to drive solvent from a body of solution to a body of pure solvent. In the present invention, this means simply that applicant applies a pressure on the solution above its osmotic pressure relative to the pure solvent. Under such conditions, the vapor pressure of the solvent in the solution is greater than the vapor pressure of the solvent in the pure solvent so that the solvent molecules will evaporate and diffuse from the solution to the body of pure solvent. For example, in the case of sea water and fresh water, a pressure of 30 atmospheres on the sea water higher than the pressure on the fresh water will cause fresh water to vaporize from the sea water and diffuse and condense in the body of fresh water.

Another feature of the present invention is the utilization of capillary forces to maintain the pressure difference between the body of the solution and the body of solvent. By utilizing a fluid gap, such as an air gap, between the body of solution and body of solvent and semipermeable membranes defining such air gap and supporting the body of solution and body of fresh water, the pressure in excess of the osmotic pressure may be exerted upon the solution relative to the solvent while said bodies are in communication to permit solvent vapor molecules to vaporize from the body of solution to diffuse through the fluid gap and to condense in the body of solvent. As noted above, the capillary forces in the semipermeable membranes support the difference in pressure.

Another feature of the present invention is the utilization of a pressure in the aforementioned fluid gap greater than the pressure on the body of solution so that the prevention of flow of liquid from the body of solution to the body of solvent is assured.

Still another feature of the present invention is the utilization of a powder layer in the aforementioned air gap to support the two permeable membranes.

Still another feature of the present invention is the utilization of a layer of granular material on the exterior surfaces of said aforementioned semipermeable membranes to support them.

Still another feature of the present invention is the utilization of a fluid gap composed of an oil film which permits extremely small separations between the body of solution and the body of solvent.

The foregoing disclosure is intended to be illustrative of representative and preferred forms of the present invention. In the claims appended hereto where elements of the method and apparatus are referred to generically, it is intended that such reference shall embrace the corresponding elements described in the disclosure and equivalents thereof. It is intended that the claims shall cover and embrace the invention both generically and specifically, the disclosure being illustrative and the invention to be accorded the full scope of the claims.

I claim:

1. A cell for separating solvent from solution by diffusion transfer activated by pressure comprising:
   (a) an enclosed body of solvent;
   (b) an enclosed body of solution containing said solvent maintained under a pressure greater than the pressure on said body of solvent, said solution pressure being sufficient to increase the vapor pressure of the solvent therein above the vapor pressure of said body of solvent;
   (c) a pair of closely spaced, thin, permeable sheets separtting said body of solvent from said body of solution, said sheets having a narrow gap therebetween; and
   (d) a body of fluid enclosed in said gap at a pressure greater than the pressure on said body of solution but insufficient to render said cell inoperative,
      (I) said body of fluid being adapted to permit the flow of solvent vapor from said solution and to prevent the flow of solution from said body of solution to said body of solvent, and
      (II) said sheet producing sufficient capillary forces to maintain said body of fluid in said gap and the pressure difference between said gap and said body of solvent.

2. A cell as stated in claim 1 wherein said gap is maintained by a layer of fine powder between said sheets.

3. A cell as stated in claim 1 wherein said fluid is air.

4. A cell as stated in claim 1 wherein said fluid is hydrogen gas.

5. A cell as stated in claim 1 wherein said fluid is an oil film.

6. A cell as stated in claim 1 wherein each of said sheets is maintained in position by a layer of granular material adjoining its exterior surface.

7. A cell as stated in claim 1 wherein the sheet adjoining said body of solvent produces substantially higher capillary forces than a sheet adjoining said body of solution.

8. A cell as stated in claim 1 wherein said gap is in the range of about 100 angstroms to 0.005 inch.

9. A method of separating solvent from a solution by diffusion transfer activated by pressure comprising:
   (a) supporting a body of solvent having an open surface;
   (b) supporting a body of solution containing said solvent but adjacent to said body of solvent under a pressure greater than the pressure on said body of solvent, said solution pressure being sufficient to increase the vapor pressure of the solvent therein above the vapor pressure of said body of solvent, and said body of solution having an open surface in vapor communication with the open surface of said body of solvent; and
   (c) separating said bodies of solvent and solution with a body of fluid and maintaining said body of fluid at a pressure greater than the pressure on said body of solution, said body of fluid being adapted to permit the flow of solvent vapor and to prevent the flow of solution from said body of solution to said body of solvent.

10. A method as stated in claim 9, including the sustaining of pressure differential between said body of fluid and said body of solvent by means of a permeable sheet producing sufficient capillary forces to sustain said pressure differential.

11. A method as stated in claim 9, including separating said body of solvent and solution with a pair of closely spaced, thin, permeable sheets, said sheets having a narrow gap therebetween containing said body of fluid.

12. A method as stated in claim 11, including maintaining the gap between said sheets by means of a fine layer of powder.

13. A method as stated in claim 11, including maintaining each of said sheets in position by a layer of granular material adjoining its exterior surface.

14. A method as stated in claim 11, wherein the sheet adjoining said body of solvent produces substantially higher capillary forces than the sheet adjoining said body of solution.

15. A method as stated in claim 9 wherein said fluid is air.

16. A method as stated in claim 9 wherein said fluid is hydrogen gas.

17. A method as stated in claim 9 wherein said fluid is oil.

References Cited in the file of this patent
UNITED STATES PATENTS 1,825,631    Horvath _____ Sept. 29, 1931

OTHER REFERENCES

Callendar, H. C.: Proc. Roy Soc., vol. 80, pp. 466–477 (1908).

Townend, R. V.: J. Am. Chem. Soc., vol. 50, pp. 2958–2965 (1927).